United States Patent Office 3,393,248
Patented July 16, 1968

3,393,248
RECOVERY OF BROMINE AND PREPARATION OF UNSATURATED CYCLIC HYDROCARBONS BY DEHYDROBROMINATION OF POLYBROME NAPHTHENES
Frank G. Padrta, Bellwood, Ill., assignor to Universal Oil Products Company, Des Plaines, Ill., a corporation of Delaware
No Drawing. Filed Oct. 12, 1966, Ser. No. 586,037
7 Claims. (Cl. 260—668)

ABSTRACT OF THE DISCLOSURE

Bromine is recovered and unsaturated cyclic hydrocarbons are prepared by thermal dehydrobromination of polybromo-substituted naphthenes at a temperature in the range of 300–450° C. and a pressure in the range of 50–0.0001 mm. of mercury.

---

This invention relates to a process for recovering halogens from halo-substituted high molecular weight compounds. More particularly, the invention is concerned with a process for the recovery or removal of bromine from high molecular weight bromo-substituted cycloparaffinic compounds.

With the increased use of detergents and other surface active agents, the problem of disposal of said compounds is becoming increasingly acute. For example, a major problem which is prevalent in many rivers and streams is the disposal of sewage and the inactivation of detergents which are dissolved in the sewers. Those detergents which produce stable foams in hard or soft waters may do so in such large quantities that the foam will tend to clog sewage treatment facilities and will often appear in sufficient concentration in these facilities to destroy the bacteria which are necessary for sufficient biological action for proper sewage treatment. A typical detergent which will produce this result is an alkylaryl sulfonate, which, unlike the fatty acid solutions, will not precipitate after having been mixed with hard water containing calcium or magnesium ions in solution. Inasmuch as these compounds are only partly biodegradable, the detergent persists in solution and is carried through the sewage treatment plant in substantially unchanged or still-active form. Therefore, by possessing an abiding tendency to foam, especially when mixed with an aerating device and stirrers, large quantities of foam are discharged from the sewage digestion plant into rivers and streams where the continuing presence of the detergent is marked by large masses of foam which persist on the surface of these rivers and streams. These as well as other synthetic detergents also interfere with the anaerobic process of degradation of other materials such as grease and thus compound further the pollution caused by sewage plant effluents containing such detergents. Further, these dilute detergent solutions often enter sub-surface water currents which feed into underground water strata, from which many cities draw their water supplies and thus the alkylaryl-based detergents find their way into the water supplies which are drawn from water taps in homes, factories, hospitals, schools, etc., often in sufficient quantities to make drinking water foam as it pours from the tap.

In order to combat this ever increasing presence of active and used detergents, an effort has been made to provide detergents which are more readily biodegradable. In this respect, it has been found that if the long-chain alkyl substituent on the phenyl nucleus is of a simple, straight-chain configuration, it will produce biologically soft detergents which will undergo bacterial degradation in the treatment of sewage and will not appear as active detergents in the effluents of sewage treatment plants. However, if the long-chain alkyl substituent comprises a highly complex branched-chain structure, it will not be as readily bacterially digested as the aforementioned detergents which contain a relatively straight-chain structure.

The source of the alkylating agent which provides the straight-chain alkyl group which is to be condensed with the aromatic nucleus in synthesis is an all important variable. For example, it is preferable to utilize sources in which a straight-chain alkyl group containing from 9 to about 15 carbon atoms in length will comprise the major portion of the feed. One such feed stock source comprises an appropriately boiling naphtha fraction of a straight run petroleum distillate, or of the products of the Fischer-Tropsch reaction which includes paraffinic hydrocarbons in the $C_9$–$C_{15}$ range formed by the reductive condensation of carbon monoxide, the hydrogenated products of ethylene polymerization which include paraffins having from 9 to about 15 carbon atoms, the hydrogenated fatty acids which upon complete reduction produce paraffinic hydrocarbons having relatively straight-chain configuration, etc. Other sources of paraffin hydrocarbons of whatever derivation may also be used as a source of paraffin feed stock. As hereinbefore set forth, the most widely available and generally preferred source of normal paraffins in the $C_9$–$C_{15}$ range is a naphtha fraction boiling, for example, within the range of from about 150° C. to about 250° C. of kerosene. However, most raw material sources of straight-chain paraffins comprise mixtures containing a significant proportion of branched-chain isomers along with some cyclic paraffins containing from 6 up to about 18 carbon atoms or more, and will usually contain at least 12 carbon atoms. In order to provide the desired normal paraffinic hydrocarbon feed which is thereafter used as an alkylating agent to produce biodegradable soft detergents, it is necessary to separate and recover these normal paraffins from the aforementioned branched-chain isomers and cyclic paraffins. This separation is accomplished by treating the feed stock with a separating agent which possesses the ability to selectively differentiate the normal isomers not only from the branched-chain isoparaffins but also from the cyclic paraffins. One such separating agent which is widely used comprises molecular sieves which are characterized by their chemical compositions as dehydrated metal alumino-silicates having a zeolite structure in the crystals of the alumino-silicates and containing pores of about 5 Angstrom units in cross-sectional diameter which are of sufficient size to permit the entry of normal aliphatic compounds having 4 or more carbon atoms, but are not of sufficient size to permit the entry of branched-chain or cyclic compounds. Therefore, when passing a mixture of normal, iso- and cyclic paraffins over these compounds, the normal paraffins will be selectively sorbed thereon and will thus be separated from the iso paraffins and the cyclic paraffins.

However, the separation of the normal paraffins from the branched-chain iso paraffins and cyclic paraffins is not always 100% complete, a small percentage of branched chain iso paraffins and cyclic paraffins remaining in the desired normal paraffin feed stock. This feed stock is thereafter brominated and subsequently dehydrobrominated to form an alkylating agent which, as hereinbefore set forth, is thereafter used as an intermediate in the preparation of biodegradable soft detergents.

It is therefore an object of this invention to provide a process for the removal of bromine from the high molecular weight cyclic paraffins which are still present after the bromination of an alkylating agent feed stock.

A further object of this invention is to provide a process for the dehydrobromination of high molecular weight halo-cyclic paraffinic compounds to form the corresponding unsaturated cyclic compound.

In one aspect an embodiment of this invention is found in a process for the removal of bromine from high molecular weight bromocyclic paraffinic compounds which comprises heating said compounds at a temperature in the range of from about 300° to about 450° C. at a subatmospheric pressure and thereafter recovering the resultant hydrogen bromide and corresponding unsaturated cyclic compounds.

A specific embodiment of this invention is found in a process for the removal of bromine from bromo-substituted cyclic paraffins containing at least 12 carbon atoms which comprises heating said paraffins at a temperature in the range of from about 300° C. to about 450° C. and a pressure in the range of from about 10 to about 0.0001 mm. of mercury, and thereafter recovering the resultant hydrogen bromide and naphthenes.

Other objects and embodiments will be found in the following further detailed description of this invention.

As hereinbefore set forth, the present invention is concerned with a process for the recovery of bromine with the corresponding preparation of aromatic or aromatic-type hydrocarbons. When utilizing a halogen such as bromine for the production of alkylating agents such as olefins, it is necessary that the halogenating agent be recovered in substantially quantitative amounts from the dehydrohalogenation step, in order that the process may be effected in an economical manner.

Inasmuch as the normal paraffins which comprise the preferred feed stock in an alkylation reaction for the preparation of biodegradable soft detergents will contain some branched-chain and cyclic paraffins, it is necessary that the halogenated, and particularly brominated isoparaffins or cyclic paraffins be separated and the halogenating agent recovered. The present invention is particularly concerned with a process whereby the high molecular weight cyclic paraffins which are separated by conventional means from the normal paraffins will be treated to recover the hydrogen halide, and in addition form cyclic and polycyclic aromatic compounds which may be utilized as starting materials in the preparation of other compounds. The cyclic paraffins which will be recovered after bromination thereof from the reaction mixture will usually comprise compounds containing at least 12 carbon atoms. It is to be understood that in the present specification and appended claims the term "aromatic compounds" will refer to both aromatic compounds and partially hydrogenated aromatic compounds. In addition, these compounds may also contain alkyl substituents or cycloalkyl substituents.

The polybrominated cyclic paraffins containing at least 12 carbon atoms which are recovered from the reaction mixture will, according to the process of the present invention, undergo dehydrobromination by heating said cyclic paraffins to an elevated temperature in the range of from about 300° C. to about 450° C. while maintaining the compounds at a sub-atmospheric pressure. This sub-atmospheric pressure may be effected by means of a vacuum pump and will preferably be in a range of from about 50 down to about 0.0001 mm. of mercury. At this elevated temperature and reduced pressure, the polybrominated cyclic paraffin will be dehydrobrominated to form the corresponding aromatic, partially hydrogenated aromatic compound and hydrogen bromide. The latter may then be oxidized by conventional means in the presence of oxygen, air or other molecular oxygen-containing gases at a temperature in the range of from about 50° to about 400° C. in contact with a hydrogen halide oxidation catalyst such as copper oxide, cerium oxide, etc., to form bromine. The bromine may then be utilized as the halogenating agent in a process hereinbefore described. The aromatic or partially hydrogenated aromatic compounds which are recovered such as polymethyl-substituted naphthalene, polymethyl-substituted dihydronaphthalene, poly-polymethyl-substituted tetrahydronaphthalene, alkyl-substituted indanes, anthracenes, dihydroanthracenes, tetrahydroanthracenes, etc. are recovered, separated by conventional means such as fractional distillation and thereafter used as starting materials in the preparation of other chemical compounds such as resins, pharmaceuticals, etc.

The process of the present invention in which a cyclic paraffin containing at least one bromo substituent is subjected to a dehydrohalogenation reaction may be effected in any suitable manner and may comprise either a batch or continuous type of operation. For example, when a batch type operation is used, a quantity of the bromo-substituted cyclic paraffin is placed in an appropriate apparatus which is provided with heating and vacuum means as well as means for withdrawing the hydrogen bromide which is formed during the reaction. The vessel is sealed and the pressure is exhausted by means of a vacuum pump or any other apparatus until the desired sub-atmospheric pressure has been reached. In addition, the vessel is also heated until a temperature ranging from about 300° C. to about 450° C. and preferably in a range of from 350° C. to about 400° C. has been reached. Dehydrohalogenation of a cyclic paraffin is effected under these conditions, the resultant hydrogen bromide being withdrawn through appropriate means and passed to storage, or if so desired, to an oxidation apparatus wherein the hydrogen bromide is oxidized to form elemental or molecular bromine. Upon completion of the desired residence time, the reactor and contents thereof are allowed to cool to room temperature and also are brought to atmospheric pressure. The desired aromatic hydrocarbons are recovered and separated by conventional means such as fractional distillation, crystallization, etc.

It is also contemplated within the scope of this invention that the process may be effected in a continuous manner of operation. When this type of operation is used, the bromo-substituted cyclic paraffin is continuously charged to a reaction vessel which is maintained at the proper operating conditions of elevated temperature and sub-atmospheric pressure, both temperature and pressure being within the range hereinbefore set forth in greater detail. The hydrogen bromide which is formed by the dehydrobromination reaction is continuously withdrawn through means provided therefor and subjected to oxidation in yet another apparatus while the aromatic hydrocarbons are also continuously withdrawn through separate means and subjected to separation.

The following example is given to illustrate the process of the present invention which, however, is not intended to limit the generally broad scope of the present invention in strict accordance therewith.

Example I

A mixture of paraffins containing from 10 to 14 carbon atoms were brominated in the usual manner and the main product comprising bromo-substituted paraffins were split off. The heavy brominated product comprising polybromo-substituted cyclic paraffins was recovered and placed in a heated unit which was operated at a temperature of 350° C. The unit was evacuated by means of a vacuum pump until a pressure of 0.0001 mm. of mercury was reached. The product was maintained at this temperature and pressure for a period of about 2 minutes during which time hydrogen bromide was stripped off and recovered. The resultant product was analyzed by means of a low ionizing voltage technique which is unique for unsaturated hydrocarbon analysis. This analysis disclosed the presence of aromatic-type compounds possessing the general formula:

$C_nH_{2n-6}$ through $C_nH_{2n-8, -10, -12, -14, -16, -18}$

Examples of compounds which possess these formulae include benzene, indanes or tetrahydronaphthalenes, indenes, naphthalene, acenaphthene, acenaphthalenes, anthracenes, etc. It was determined that 80% of the product which was recovered was in a range of from $C_nH_{2n-6}$ to $C_nH_{2n-12}$, the latter compound being approximately half of this range. This would infer that the precursors which underwent dehydrobromination consisted mainly of brominated decahydronaphthalene.

I claim as my invention:

1. A process for the removal of bromine from high molecular weight bromocyclic paraffinic compounds which comprises heating said compounds at a temperature in the range of from about 300° to about 450° C. at a sub-atmospheric pressure, and thereafter recovering the resultant hydrogen bromide and corresponding unsaturated cyclic compounds.

2. The process as set forth in claim 1, further characterized in that said high molecular weight bromo paraffinic compounds comprise cyclic paraffins containing at least 12 carbon atoms.

3. The process as set forth in claim 1, further characterized in that said sub-atmospheric pressure is in a range of from about 50 to about 0.0001 mm. of mercury.

4. The process as set forth in claim 1, further characterized in that said bromo paraffinic compounds comprise polybromo-substituted naphthenes.

5. The process as set forth in claim 1, further characterized in that said unsaturated compounds comprise naphthalenes.

6. The process as set forth in claim 1, further characterized in that said unsaturated compounds comprise alkyl indanes.

7. The process as set forth in claim 1, further characterized in that said unsaturated compounds comprise anthracenes.

References Cited
UNITED STATES PATENTS

| | | | |
|---|---|---|---|
| 2,183,574 | 12/1939 | Levine et al. | 260—666 |
| 3,246,043 | 4/1966 | De Rosset et al. | 260—666 |
| 3,274,273 | 9/1966 | Lester et al. | 260—666 |

DELBERT E. GANTZ, *Primary Examiner.*

C. R. DAVIS, *Assistant Examiner.*